United States Patent Office 3,264,185
Patented August 2, 1966

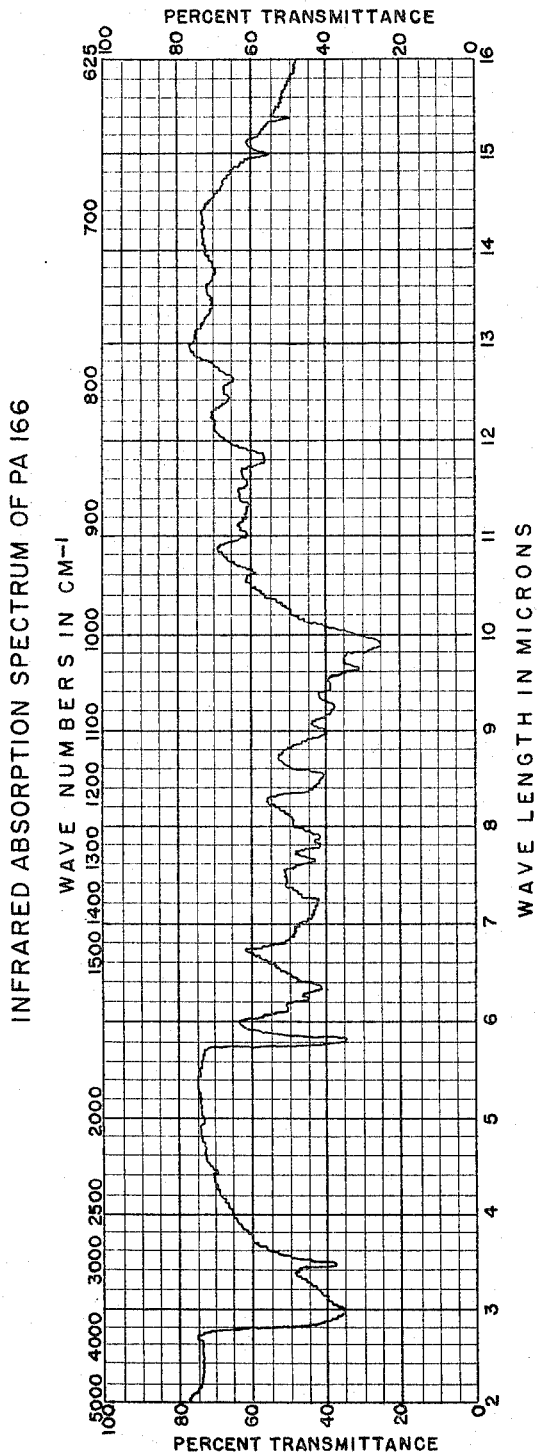

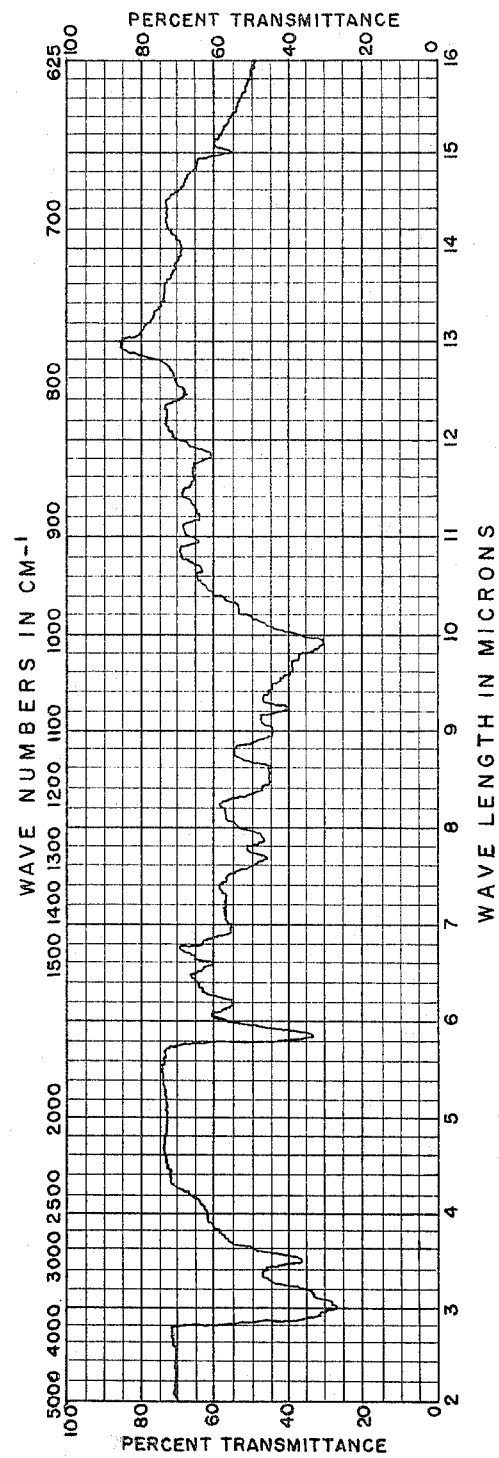

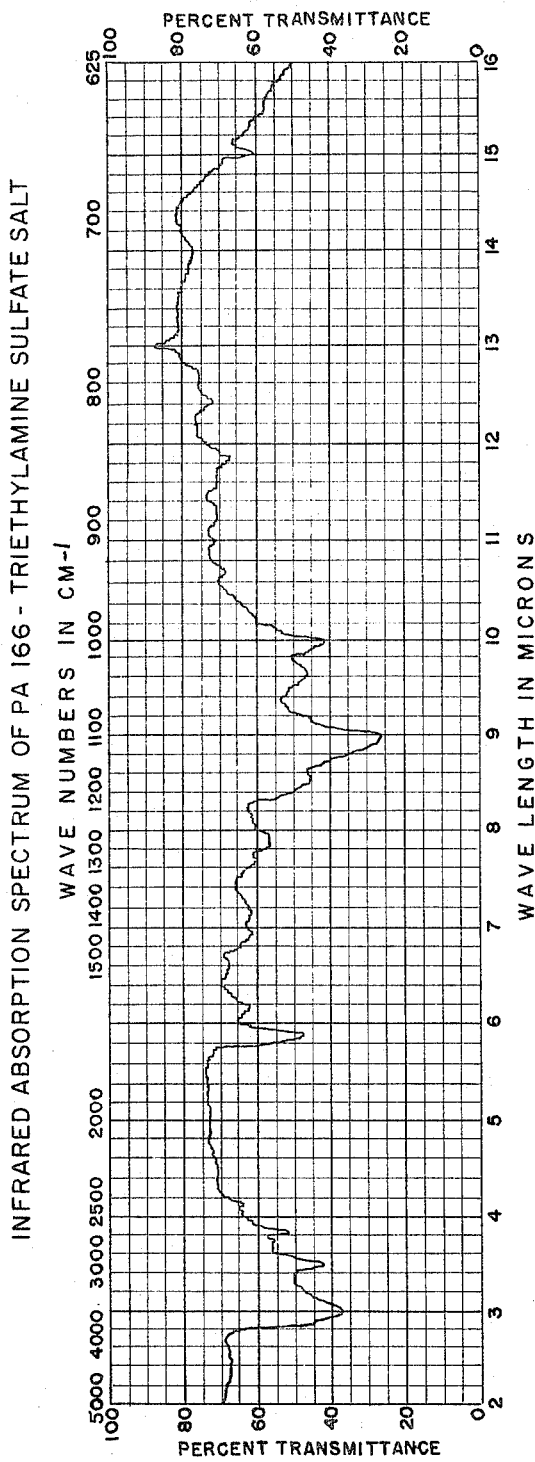

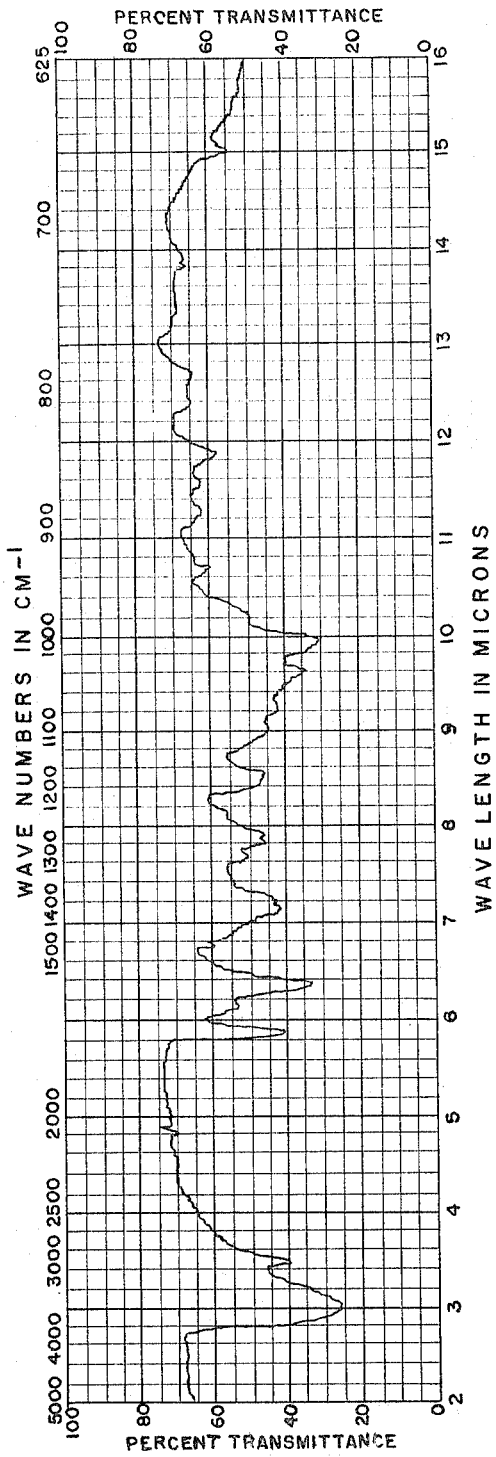

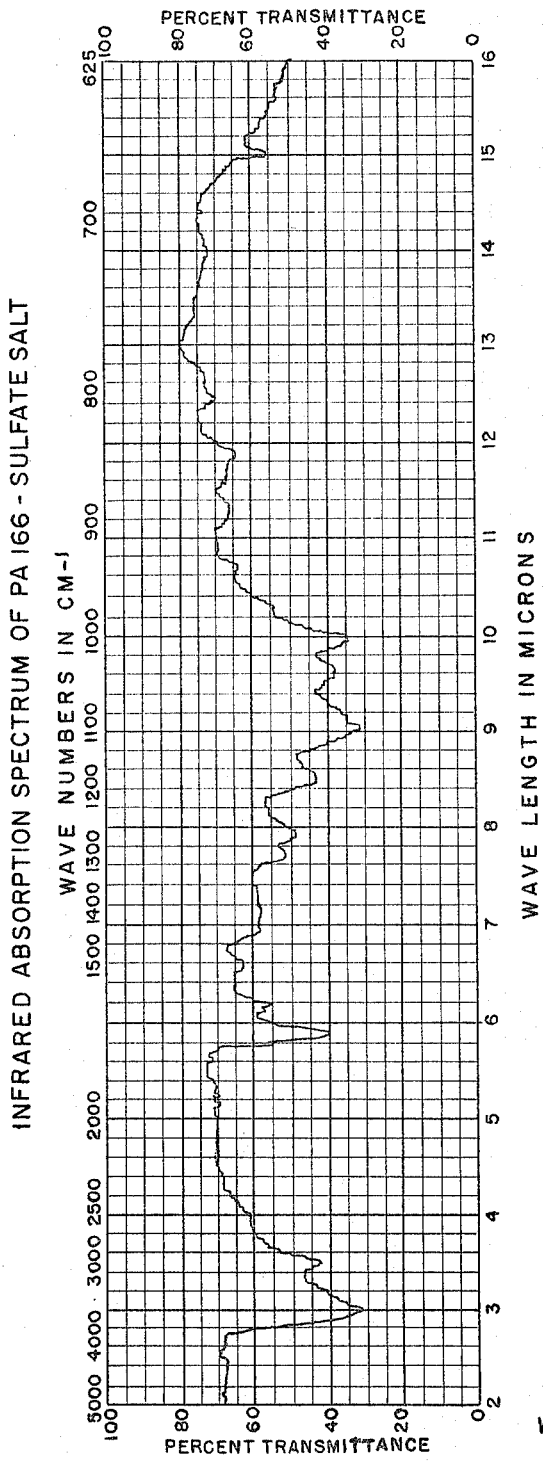

3,264,185
ANTIBIOTIC PA 166 AND METHOD OF PREPARING
William S. Marsh, Ringwood, and Koppaka V. Rao, Pinebrook, N.J., assignors to Chas. Pfizer & Co., Inc., New York, N.Y., a corporation of Delaware
Filed Mar. 5, 1957, Ser. No. 644,168
10 Claims. (Cl. 167—65)

This invention relates to a new and useful antibiotic called PA 166 and more particularly to its production by fermentation, to methods for its recovery and concentration from crude solutions, such as fermentation broths, to its purification, and to the preparation of its salts. The invention includes within its scope the antibiotic in dilute forms, as crude concentrates and in pure crystalline forms.

These novel products are especially useful as antifungal agents.

The new antibiotic is formed during the cultivation, under controlled conditions, of a new strain of a species of microorganism known as *Streptomyces glaucus*, which was identified by planting and testing a culture thereof on media normally used for the identification of such microorganisms. A culture of the microorganism has been deposited in the American Type Culture Collection, Washington, D.C., and added to its collection of microorganisms as ATCC 12730, The identification of this new strain, designated Isolate No. BA3917 in the culture collection of Chas. Pfizer & Co., Inc., of Brooklyn, N.Y., was made with the aid of Krassilnikov's "Guide to the Identification of Bacteria and Actinomycetes" (1949).

The cultural characteristics of the new strain of *S. glaucus* are set forth in the following table. Except where otherwise noted, the results are based upon six replicates incubated for two weeks. The colors where R is written are those of Ridgway, "Color Standards and Nomenclature."

| Medium | Amount of Growth | Aerial Mycelium and Sporulation | Soluble Pigment | Remarks |
|---|---|---|---|---|
| Glucose-Asparagine Agar | Moderate | Rare, white | None | Vegetative mycelium cream to yellowish tan (Cream Color to Naples Yellow [R]); surface costate with irregularly anastomosing ribs; reverse creamy white to yellowish tan (Naples Yellow [R]). Dilution Plates—similar to spot plantings. Spores borne in moderately tight spirals, terminal, scattered and sometimes in pairs, often forming dense clusters; oval, 0.65–1.00×1.30μ. |
| Skimmed milk | Moderate | Sparse, white | Very pale pink (Seashell Pink [R]). | Ring Creamy white to yellowish pink (Light Salmon Orange to Bittersweet Pink [R]); milk coagulated, slight peptonization; pH change from pH 6.5 to pH 6.4. |
| Glucose Agar | Moderate or moderate to good. | Moderate, white to grayish white. | Orange-Brown (Orange Cinnamon to Vinaceous Tawny [R]). | Vegetative mycelium colorless; reverse colorless to light pinkish brown (Pinkish-Cinnamon [R]). |
| Nutrient Agar | Poor to moderate | Sparse, white | Slight, light yellowish tan (Warm Buff [R]). | Vegetative mycelium colorless; reverse colorless to yellowish white. |
| Synthetic Agar | Moderate or moderate to good. | Good, white to grayish white to greenish gray (Pale Olive Gray to Olive Gray [R]). | Very light grayish tan (Ecru Drab to Drab Gray [R]). | Vegetative mycelium colorless, where visible; growth deeply penetrating; reverse light gray to brownish yellow (Wood Brown [R]). |
| Calcium Malate Agar | Moderate | Good, white to greenish gray (Light Grayish Olive to Olive Gray [R]). | Light grayish tan (Ecru Drab to Drab Gray [R]). | Vegetative mycelium colorless where visible; reverse brownish gray (Buffy Brown [R]); malate digested. |
| Cellulose | Very slight | White to gray | | |
| Potato Slants | Very slight growth on five slants; sixth moderate. | Sparse, white to light gray. | Grayish brown (Drab Gray [R]). | Vegetative mycelium reddish brown (Vinaceous Russet [R]); reverse orange (Apricot Buff [R]). |
| Dextrose Nitrate Broth | Good | Moderate, white | Slight yellow | Vegetative mycelium colorless; no reduction of nitrates to nitrites. |
| Emerson Agar | Moderate to good | Sparse to moderate; white. | Yellowish brown (Sudan Brown [R]). | Vegetative mycelium colorless; reverse colorless. |
| Starch Plates | Poor to moderate | Sparse, white | None | Vegetative mycelium colorless to pale yellowish tan; colonies flat, slightly raised at center; very slight hydrolysis of starch. |
| Gelatin Plates | Moderate | Good, white | None | Vegetative mycelium yellowish tan where visible; zone of liquefaction 1.8 cm. to 2.5 cm. in diameter. |

This species of organism is described particularly in N. A. Krassilnikov's "Guide to the Identification of Bacteria and Actinomycetes," 1949 (translation), where it is termed *Actinomyces glaucus*. Some of the significant differences between the Krassilnikov strains and the new strain ATCC 12730 are as follows:

TABLE II

| Medium | ATCC 12730 | Krassilnikov Strains |
|---|---|---|
| Potato slants | Very poor growth | Excellent growth. |
| Starch plates | Very slight hydrolysis | Rapid hydrolysis. |
| Dextrose nitrate broth | Nitrates not reduced | Nitrates reduced. |
| All agars | No downy aerial mycelium | Downy aerial mycelium. |

It is to be understood that for the production of PA 166 the present invention is not limited to this particular organism or to organisms fully answering the above description, which is given only for illustrative purposes. In fact, it is especially desired and intended to include the use of mutants produced from the described organism by various means, such as X-radiation, ultraviolet radiation, nitrogen mustards, and the like.

PA 166 is particularly characterized by its antifungal activity. At levels of about 100 gamma per milliliter it shows substantially no antibacterial cavity. The following table illustrates the antifungal spectrum of the antibiotic. These tests were run by the agar incorporation method using various concentrations of the pure antibiotic with the particular organism specified. The "minimum inhibitory concentration" indicated in Table III is the minimum concentration of the antibiotic (in micrograms/milliliter) at which growth of the microorganism failed to occur. Since the highest concentration employed in this test was 50 mcg./ml., the "minimum inhibitory concentration" is not precisely stated where such concentration apparently exceeded 50 mcg./ml. The test was conducted under standardized conditions.

TABLE III.—SPECTRUM OF PA 166

Pathogenic fungi: MIC mcg./ml.
- Histoplasma capsulatum _____ <0.1
- Microsporum canis _____ >50
- Blastomyces brasiliensis _____ 10
- Blastomyces dermatitidis _____ >50
- Trichophyton sulfureum _____ >50
- Trichophyton violaceum __pi (partial inhibition)__ 1
- Sporotrichum schenckii _____pi__ 1
- Hormodendrum compactum _____ 1
- Cryptococcus neoformans _____pi__ 1
- Phialophora verrucosa _____ 10
- Candida albicans 8 _____ 10
- Candida albicans 9 _____ >50
- Candida albicans 11 _____ >50
- Candida albicans 13 _____ >50
- Candida albicans "C" _____pi__ 10
- Epidermophyton floccosum _____ 10
- Microsporum audouini _____ 1
- Trichophyton rubrum _____ 10
- Pityrosporum ovale Traub _____ 50
- Pityrosporum ovale 12078 _____ 10
- Torulopsis albida 10666 Y–1400 _____ >50

Phytopathogenic fungi:
- Alternaria solani _____ 1
- Botrytis allii _____ 10
- Septoria nodorum _____ 1
- Endothia prasitica _____ 1
- Neocosmosphora vasinfecta _____pi__ 1
- Fusarium oxysporium _____ 10
- Nematospora coryli _____ 50
- Ceratostomella ulmi (Ophiostoma) _____ 1

TABLE III.—SPECTRUM OF PA 166—Continued

Phytopathogenic fungi (continued):
- Sclerotinia fructicola _____ 1
- Colletotrichum circinans _____pi__ 1
- Verticillium albo-atrum _____ 1
- Physalaspora malorum _____ 1
- Helminthosporium victoriae _____ 1
- Hormodendrum resiniae _____ 1
- Glomerella cingulata _____ 10
- Phoma betae _____ 10
- Fusarium lycopersici var. bulgigenum _____ 10
- Diplodia zeae _____ 1
- Rhizoctonia solani _____ 1
- Pythium debaryanum _____ 1
- Helminthosporium terricium _____ 1
- Mycogone penniciosa _____ <0.1
- Penicillium sp. marathon number 7 _____ 1

Saprophytic fungi:
- Rhizopus nigricans _____ >50
- Penicillium steckii _____ 10
- Aspergillus niger _____ 1
- Penicillium frequentans _____ 1
- Penicillium citrinum _____ 1
- Penicillium funiculosum _____ 10
- Aspergillus nidulous _____ 10
- Penicillum soppi _____ 1
- Aspergillus terreus _____ 50
- Aspergilus fumigatus _____ 10
- Paecilomyces varioti _____ 10
- Aspergillus flavus oryzae _____ 10
- Hormodendron sp. (Wehmyer) _____ 10
- Mucor mucedo _____ 10
- Penicillium oxalicum _____ 10
- Saccharomyces cerevisiae _____ 50
- Schizosaccharomyces octosporus _____ 1
- Pullularia pullulons _____ 10
- Byssochlamys fulva _____ 1
- Cladosporium harbarum _____ 1
- Cladosporium (Hormodendrum) cladosporioides _____ 1
- Endomyces fibuliger _____ 10
- Margarinomyces bubaki _____ 10
- Oospora lactis _____ 10
- Penicillium digitatum _____ 10

These in vitro results demonstrate that the new antibiotic has excellent activity against plant pathogens and saprophytic fungi. For instance, PA 166 finds particular utility combatting various plant fungal diseases.

An especially noteworthy value of the new antibiotic lies in the fact that it is non-irritating to the skin and the sensitive mucosa and other membranous tissues. A 1% ointment of PA 166 was tested for dermal irritation in rabbits. The ointment was applied to both intact and abraded skin areas of male albino rabbits daily for five days. White petrolatum was similarly applied to three rabbits which served as controls.

A summary of the results follows:

| Compound | Skin Condition | No. Areas Treated | Average 24 hr. irritation scores ||||| 
|---|---|---|---|---|---|---|---|
| | | | R/1 | 2 | 3 | 4 | 5 |
| PA 166 | Intact | 6 | 0 | 0 | 0 | 0 | 0 |
| | Abraded | 6 | 0.3 | 1 | 1 | 1 | 1 |
| Control: | | | | | | | |
| White | Intact | 6 | 0 | 0 | 0 | 0 | 0 |
| Petrolatum | Abraded | 6 | 1 | 1 | 1 | 0.7 | 0.7 |

Thus it is clear that the new antibiotic does not produce any greater degree of irritation than is produced by white petrolatum, which is well-known to be very mild.

The antibiotic is also characterized by a low level of toxicity when used in test animals. For example, the $LD_{50}$ value, when PA 166 is administered intraperitoneally to mice in an aqueous vehicle, is greater than 12.5 mg./kilogram. Administered orally, there is 100% survival even at dosages as high as 1 gram/kg. Toxicity to other species, by other routes and with other forms of the antibiotic is comparable. For instance, the toxicity of the PA 166 triethylamine sulfate salt was tested on mice of 11–15 grams weight with the following results:

| Route | Dosage, mg./kg. | Percent Survival at 96 Hours |
|---|---|---|
| Subcutaneous | 1,000 | 100 |
| | 500 | 100 |
| | 250 | 100 |
| Oral | 1,000 | 50 |
| | 500 | 80 |
| | 250 | 100 |

The invention includes within its scope a process for growing the microorganism *S. glaucus*. The cultivation of this microorganism preferably takes place in aqueous nutrient media at a temperature of about 24–30° C., and under submerged conditions of agitation and aeration. Nutrient media which are useful for this process include a carbohydrate, such as sugars, starch, glycerol, corn meal, and a source of organic nitrogen, such as casein, soybean meal, peanut meal, wheat gluten, cottonseed meal, lactalbumin, enzymatic digest of casein, tryptone. A source of growth substances, such as distillers' solubles, yeast extract, molasses fermentation residues, as well as mineral salts, such as sodium chloride, potassium phosphate, sodium nitrate, magnesium sulfate and trace minerals such as copper, zinc and iron may also be utilized with desirable results. If excessive foaming is encountered during the fermentation, anti-foaming agents, such as vegetable oils, may be added to the fermentation medium. The pH of the fermentation tends to remain rather constant, but, if variations are encountered, a buffering agent, such as calcium carbonate may also be added to the medium.

Inoculum for the preparation of PA 166 by the growth of *S. glaucus* may be obtained by employing growth from slants on such media as Emerson's agar or beef lactose. The growth may be used to inoculate either shaken flasks or inoculum tanks for submerged growth, or, alternatively, the inoculum tanks may be seeded from the shaken flasks. The growth of the microorganism usually reaches its maximum in about two or three days. However, variations in the equipment used, the rate of aeration, rate of stirring and so forth may affect the speed with which the maximum activity is reached. In general, from about 24 hours to four days is a desirable period for producing the antibiotic. Aeration of the medium in tanks for submerged growth is maintained at the rate of about one-half to two volumes of free air per volume of broth per minute. Agitation may be maintained by suitable types of agitators generally familiar to those in the fermentation industry. Aseptic conditions must, of course, be maintained throughout the growth of the microorganism.

After growth of the microorganism, the mycelium may be removed from the fermentation broth using standard equipment, such as filter-presses, centrifuges, and so forth. The antibiotic may be recovered from the fermentation broth by several different procedures. Alternatively, the whole broth may be uesd as is or it may be dried. The antibiotic may be further purified by various means; for instance, the compound may be extracted from aqueous medium, at pH preferably between about 5 and about 8, by means of a variety of polar, water-immiscible organic solvents, particularly alcohols such as butanols, pentanols, hexanols, benzyl alcohol, etc. Upon concentrating the solution the antibiotic separates as a purified solid, often in microcrystalline form if care is taken to remove all of the broth and concentrate carefully in the presence of water. When a concentrate is obtained the water may be removed and further concentration causes crystallization. A cruder material may be precipitated from the solvent extract by a liquid aliphatic hydrocarbon such as hexane, ligroin, etc.

Not only does the broth obtained during the fermentation contain PA 166, but it has been found that further material may be recovered by extracting the filtered mycelium. This may best be done by suspending the mycelium in an alcohol-type solvent, which may be either water-immiscible, such as butanol, or water-miscible, such as methanol, ethanol and isopropanol, and agitating for a short time. The mycelium is then fitlered again and the alcohol-type solvent is found to be enriched in the antibiotic. If a water-miscible solvent is used, this mother liquor is then best concentrated in vacuo and extracted with butanol or another water-immiscible alcohol. If the solvent is completely removed a solid concentrate with a potency of about 2500–4500 rimocidin u./mg. is obtained.

All of these alcohol solutions, e.g. butanol, can then be concentrated in a vacuum at a moderately elevated temperature, preferably up to 40° C., to yield a concentrate of pronounced antifungal activity. In such a procedure, it is desirable to have some water present in the butanol at all times. During the distillation of wet butanol, there is a tendency towards dehydration of the residual butanol in the still pot due to distillation of a water-rich butanol-water azeotrope. This may be avoided by maintaining an appreciable amount of water in the butanol at all times, preferably by the presence of a separate water layer. After the butanol is completely or substantially completely removed, the concentrate may be used directly for the treatment of fungus infections, it may be further purified, or it may be reduced to a dried state.

Recovery of the antibiotic from butanol solutions treated in this manner results in dried products or in concentrates of high purity. Various impurities may also be removed from the PA 166 solution by treatment with materials capable of removing anions and cations by exchange reactions. Examples of such materials are the synthetic ion-exchange materials, Amberlite IR100, Amberlite IRC50, and the like. Synthetic inorganic ion-exchange materials, such as permutite, and various derived natural materials, such as sulfonated coals and sulfonated humic acid may also be used.

Upon concentrating the immiscible organic solvent solution of the PA 166, preferably in the presence of water, until a suitable concentration is obtained, the antibiotic may be separated in crystalline form. After filtering off the crystalline material, it may be dried and used in its purified form. However, a still more highly purified material may be obtained by recrystallization of this product. For instance, it has been found that, after washing it with a mixture of ethyl acetate, t-butanol and water, crystalline PA 166 may be dissolved in a lower alcohol, such as methanol, containing an organic amine sulfate, such as triethylamine sulfate. Upon addition of acetone, purified crystals of the antibiotic separate, for instance, in the form of the crystalline triethylamine sulfate double salt. This double salt may be converted to the amphoteric compound by treatment in aqueous methanol with alkali followed by careful adjustment to about neutrality with an acid such as phosphoric. The crystalline product separates.

Metallic salts of the new antibiotic herein described may be prepared. It is generally necessary to carry out the formation of these salts from the antibiotic itself in a solvent and preferably in one of the lower alcohols. Methanol is the most useful of these solvents. If a product of high purity is used as starting material, crystalline metallic salts, such as the sodium salt, may be obtained. The crystalline sodium salt is prepared by treating a methanolic solution of crystalline PA 166 with the proper amount of sodium hydroxide and freeze-drying.

A method of assay of PA 166 is by means of a standard culture of the yeast, *Saccharomyces cerevisiae*, which is used in an agar plate assay method with rimocidin as a standard. The potency of pure PA 166 has a value of about 6000–9000 rimocidin-units/mg., while the broths hereinbefore described have a potency of at least about 1000 yeast units/ml.

The antibiotic PA 166 is an amphoteric, white, crystalline compound. It is sparingly soluble in the lower aliphatic alcohols, being soluble therein only to the extent of at most 50–100 gamma per cc. It is substantially insoluble in acetone, chloroform, water, ethyl acetate and benzene, but readily soluble in pyridine, N-dimethylformamide, aqueous hydrochloric acid and sodium hydroxide. It is soluble in wet butanol. It also has the peculiar property of being soluble in methanol containing 1–2% by weight of calcium chloride, although it is only sparingly soluble in methanol per se. It has a very distinctive color characteristic, in that in concentrated hydrochloric acid it gives a blue color which is stable for about an hour. It reacts with bromine in carbon tetrachloride and decolorizes aqueous potassium permanganate. The antibiotic gives a positive ninhydrin test, and a positive dinitrophenylhydrazone test. It gives a transient violet color with concentrated sulfuric acid. It is generally unstable in aqueous acids but will maintain its activity for several hours at room temperature at approximately pH 2–10. It is most stable in a pH range of about 5 to 10. The stability of the antibiotic is indicated by the following table in which is given the half life time in days of a 0.02% solution in 80% ethanol at room temperature (in the dark).

| pH | 3.5 | 7 | 8.5 | 10 | 12 |
|---|---|---|---|---|---|
| Half life | 49 | >49 | >49 | >49 | 19 |

Chemically the new antibiotic appears to be a tetra-ene. It has the ultraviolet characteristics of this class of compounds when dissolved in the minimum volume of dimethylformamide and diluted with methanol:

$E_{1cm}^{1\%}$ at 291 m$\mu$=710, $E_{1cm}^{1\%}$ at 304 m$\mu$=1090, $E_{1cm}^{1\%}$ at 319 m$\mu$=990

It is clearly distinguished from fungicidin and rimocidin, other tetra-enes, by its antifungal activity which is 3 to 4 times greater. It is also clearly distinguished from amphotericin by its peculiar optical rotation, ultraviolet spectrum, infrared spectrum and neutralization equivalent. In two separate tests neutralization equivalents of 796 and 829 were obtained. The optical rotation of PA 166 in 0.1 N HCl and methanol (1% concentration) is particularly characteristic. In one test the initial rotation was 49.9° and changed to −83.9° in 2½ hours. In a second test the rotation initially was 43° and in 3 hours, −90°. Optical rotation in 0.1 N HCl in N-dimethylformamide (1% concentration) is 240–242°.

The antibiotic shows no definite melting point but gradually turns brown and decomposes above 150° C. After two crystallizations from a mixture of methanol and methylene chloride, PA 166 separates out as colorless clusters of thin rectangular plates. It has the elemental analysis: Carbon 59.59% by weight, hydrogen 7.66, nitrogen 2.00. Both acid and basic salts are readily prepared from the amphoteric compound, for instance the sodium, potassium, calcium, sulfate, hydrochloride and triethylamine sulfate salts. As above described the sodium salt can be prepared simply by trituration with sodium hydroxide to pH 8–9 and freeze-drying. The hydrochloride salt may be prepared by passing anhydrous hydrogen chloride through an acetone suspension of the antibiotic.

The properties of various forms of the antibiotic are summarized in the following table:

| Compound | Rotation [α]$_D^{25}$ | | | E1% at λ$_{max}$. m$\mu$. 1 cm. | | | | Infrared Spectrum, Figure | Analyses |
|---|---|---|---|---|---|---|---|---|---|
| | Pyridine | DMF [1] | Methanol | [2] 319 | [2] 304 | [2] 291 | [2] 281 | | |
| PA 166 (Free base) | +275° (C, 0.2%) | +257° (C, 0.2%) | | [3] 993 | [3] 1,098 | [3] 712 | [3] 371 | 1 | C, 59.59%. H, 7.66. N, 2.00. No Halogen. No Sulfur. |
| PA 166 Sodium Salt | | | +194° (C, 0.2%); +200° (C, 0.2% 80% aq. MeOH). | [4] 960 | [4] 1,055 | [4] 680 | [4] 348 | 4 | C, 57.40. H, 7.67. N, 1.92. Na, 2.94. |
| PA 166 Triethylamine Sulfate | +187° (C, 0.08%) | +266° (C, 0.2%) | +256° (C, 0.2%) | [3] 778 | [3] 857 | [3] 553 | [3] 285 | 3 | C, 54.82. H, 7.93. N, 3.26. S, 3.59. |
| PA 166 Sulfate | +274° (C, 0.2%) | +228° (C, 0.2%) | | [3] 904 | [3] 998 | [3] 641 | [3] 334 | 5 | C, 54.51. H, 7.12. N, 2.04. S, 2.07. |
| PA 166 Hydrochloride | +235° (C, 0.2%) | +239° (C, 0.2%) | +184° (C, 0.2%) | [4] 878 | [4] 964 | [4] 620 | [4] 322 | 2 | C, 54.10. H, 7.20. N, 2.05. Cl, 5.57. |

[1] Dimethyl formamide.
[2] Inflection.
[3] In 0.001 N NaOH 80% aq. MeOH.
[4] In 80% aq. MeOH.

The infrared spectrum of the free base shown in FIGURE 1 has more prominent maxima at the following frequencies (in reciprocal centimeters): 1005, 1053, to 1031, 1085, 1279 to 1255, 1401, 1563, 1706, 2866 and 3333.

The infrared spectrum of the hydrochloride of PA 166, shown in FIGURE 2, has more prominent maxima at the following frequencies (in reciprocal centimeters): 846, 913, 1008, 1083, 1111, 1272, 1300, 1515, 1629 to 1610, 1706, 2866 and 3311.

The infrared spectrum of the triethylamine sulfate of PA 166, shown in FIGURE 3, has more prominent maxima at the following frequencies (in reciprocal centimeters): 1004, 1034, 1112, 1263, 1299, 1621, 1706, 2618, 2874 and 3322.

The infrared spectrum of the sodium salt of PA 166, shown in FIGURE 4, has more prominent maxima at the following frequencies (in reciprocal centimeters): 843, 1008, 1040, 1183 to 1170, 1261, 1276, 1300, 1406, 1572, 1706, 2874 and 3300.

The infrared spectrum of the sulfate of PA 166, shown in FIGURE 5, has more prominent maxima at the following frequencies (in reciprocal centimeters): 1003, 1042, 1107, 1176, 1266, 1299, 1618, 1704, 2857 and 3300.

All of the infrared spectra were measured at a concentration of 1% in potassium bromide pellet.

The invention is further illustrated by the following examples, which are not to be considered as imposing any limitation thereon.

*Example I*

A slant of *S. glaucus* ATCC 12730 on Emerson agar was cultivated under controlled conditions to develop spores for the purpose of inoculating a nutrient medium of the following composition:

| | Grams |
|---|---|
| Cerelose (dextrose hydrate) | 10 |
| Soybean meal | 10 |
| Sodium chloride | 5 |
| Distillers' solubles | 5 |
| Calcium carbonate | 1 |

This mixture of nutrients was diluted to a volume of one liter with water, adjusted to a pH of 7 with potassium hydroxide, and subjected to heat sterilization. Thereafter, the medium was cooled and the spores were added thereto under aseptic conditions. The cultivation of the organism was conducted in shaken flasks at about 25° C. for a period of two days. The mixture of broth and mycelium thus formed was then transferred to 20 times its volume of a sterile fermentation medium having the following composition:

| | Grams/liter |
|---|---|
| Cerelose (dextrose hydrate) | 10 |
| Distillers' solubles | 5 |
| Soybean meal | 10 |
| Corn starch | 5 |
| Disodium phosphate | 3 |
| Sodium chloride | 0.1 |
| Potassium chloride | 0.1 |
| Magnesium sulfate | 0.1 |

This medium was adjusted to pH 7 and sterilized in the usual manner, before transferring the broth and mycelium thereto. During the fermentation the pH dropped to about 6–6.2 and maximum yields were produced in 40–45 hours. Submerged aerobic fermentation was utilized.

At the end of the fermentation period a diatomaceous earth filteraid, 1–5% Supercel, was employed to separate the mycelium from the broth. The wet mycelial cake was extracted by adding sufficient methanol to form a thin slurry and stirring for 4 hours (2–6 hours are generally suitable). The residual mycelium was filtered off and the mother liquor concentrated in vacuo at 35° C. The concentrate was then extracted once with n-butanol.

The separated fermentation broth was meanwhile extracted once with one-third its volume of n-butanol (generally ⅕–⅓ volumes are satisfactory). This butanol extract was combined with the butanol extract of the mycelium cake and the mixture concentrated at 30° C. under reduced pressure to about 1/40 of its volume. Upon standing at room temperature for about two days, a precipitate of the crude, amorphous antibiotic separated out. This solid was filtered off and the mother liquor extracted with hexane, whereby additional antibiotic was recovered. This precipitate is generally 10–20% pure.

This crude material was finely powdered and shaken with a mixture of water, ethyl acetate and tertiary butanol in the proportions by volume respectively of 5:4:1. Ten grams of the powder were vigorously shaken with 100 cc's each of the two phases formed in the solvent mixture. Water-soluble impurities were thus removed in the aqueous phase, and upon filtration the antibiotic, which remained insoluble in both phases, was recovered. If desired, this process can be repeated.

This more purified PA 166 was then dried at room temperature in vacuo to obtain a fine, amorphous, white to light gray powder of about 50% purity. A 1:1 mixture of methanol and methylene chloride was next added to this in the proportions of 25 cc. to 1 gram. The mixture was shaken and the powder went into solution at once. Upon standing fifteen minutes at room temperature (from 2–30 minutes are satisfactory at room temperature or below) a white, micro-crystalline solid precipitated in a yield of 50%. This can be filtered and is sufficiently purified for many antibiotic uses. The filtrate can also be re-used in the process. Also, too, other mixtures of solvents can be readily employed, for instance methanol and chloroform.

If it is desired to pury the PA 166 even further, this can be readily accomplished by repeating the same extraction step. Pure crystalline PA 166 has the properties hereinbefore described.

*Example II*

The process of Example I was repeated, this time employing for the fermentation medium ten grams per liter dextrose hydrate, five sodium chloride, five Curbay Bg (molasses residue), ten corn starch and ten soybean meal. The resultant broth was extracted by the method of Example I with butanol and butanol was this time employed to extract the wet mycelium cake. The combined butanol extracts were allowed to stand for 5 days at 15° C. and the resulting crude precipitate of PA 166 recovered. This was extracted as in Example I with a water-ethyl acetate-tertiary butanol system. The resulting amorphous powder was then dissolved in methanol containing 2% by weight calcium chloride. The solution was filtered to remove insoluble impurities and then treated with ½ its volume of water and concentrated in vacuo at 30° C. Upon the addition of methanol, the antibiotic in purified crystalline from precipitated.

The antibiotic was suspended in acetone and anhydrous hydrogen chloride bubbled through it. The hydrochloride salt of PA 166 was thus obtained.

*Example III*

19.9 grams of crude PA 166 (2460 rimocidin units per milligram) were stirred with 200 ml. of a 40% solution of triethylamine sulfate in methanol for 15 minutes. The solution was diluted with 200 ml. of methanol and filtered through diatomaceous earth filteraid. The solution was evaporated under vacuum at 30° C. to 200 ml. The concentrate was stirred and 1.5 liters of acetone were slowly added. The crystalline triethylamine sulfate salt of the antibiotic separated in the form of needles. These were filtered and the product was washed with 200 ml. of acetone. The crystals were sucked free of solvent under an atmosphere of nitrogen and they were then dried in a desiccator under vacuum over anhydrous calcium chloride. The product weighed 7.6 grams and assayed 4470 units per milligram.

Example IV 1.0 gram of crystalline triethylamine sulfate salt of PA 166 was suspended in 100 ml. of 50% aqueous methanol. One milliliter of 2.54 N-methanolic sodium hydroxide was added to dissolve the antibiotic. The solution had a pH of about 10. The mixture was filtered and carefully adjusted to pH 7 with 92 ml. of 0.05 N-phosphoric acid in 50% aqueous methanol. The suspension of antibiotic was cooled in an ice bath and the product was filtered. It was then washed with 50% aqueous methanol and with acetone and sucked dry under nitrogen. There was obtained 0.57 gram of crystalline PA 166 free base assaying 6570 rimocidin units per milligram. A sample was dried for one hour at 56° C. under high vacuum before analysis.

Example V

A suspension of 0.80 gram of free base of PA 166 was suspended in 8 ml. of methanol and treated with 8 ml. of a methanolic solution containing 0.49 ml. of 2.54 N-methanolic sodium hydroxide. The antibiotic partially dissolved and then began to crystallize as the sodium salt. The solution was cooled in an ice bath and stirred for one hour. The crystalline sodium salt was then filtered and washed with a small amount of cold methanol and sucked dry under nitrogen. The product weighed 0.75 gram and had a potency of 6470 rimocidin units per mg. A sample was analyzed as indicated above after drying for one hour at 56° C. under high vacuum. The salt is slightly soluble in methanol and water but insoluble in acetone and ethyl acetate. It hydrolyses slowly in aqueous solution to give the crystalline base.

Example VI

A solution of 50 grams of PA 166 was dissolved in a mixture of 5 ml. of 40% triethylamine sulfate and methanol and 7 ml. of methanol. The mixture was filtered and the filtrate was treated with 50 ml. of acetone. This solvent was added slowly with agitation. Crystalline triethylamine sulfate salt separated. The mixture was cooled in an ice bath and filtered. It was washed with a mixture of 4 volumes of acetone and one volume of methanol. It was then washed with acetone and sucked dry under nitrogen. The product weighed 0.42 gram and assayed 5130 rimocidin units per mg. A sample was dried for analysis at 56° C. under high vacuum for 2 hours. Its analysis is given above. The salt is slightly soluble in pyridine, dimethylformamide and dioxane. It is insoluble in acetone and water.

Example VII

A solution of 0.50 gram of purified PA 166 in 30 ml. of N,N-dimethylformamide and 12.5 ml. of acetone was treated with 8.9 ml. of 0.1 N-sulfuric acid to adjust the pH to 3. The solution was filtered and 150 ml. of ethyl acetate was slowly added. The crystalline PA 166 sulfate crystallized and the mixture was cooled. The product was filtered, washed with acetone and sucked dry under nitrogen. It weighed 0.19 gram and assayed 5160 rimocidin units per mg. A sample was dried for one hour at 56° C. under high vacuum before analysis. The analyses are given above. The salt is soluble in pyridine and N,N-dimethylformamide, slightly soluble in methanol and insoluble in acetone, ethyl acetate and water.

Example VIII

A suspension of 1.0 grams of purified PA 166 in 25 ml. of acetone and 10 ml. of N,N-dimethylformamide was treated with 7 ml. of 0.1 N-hydrochloric acid. This dissolved most of the solid. The solution, which was at pH 3, was filtered and 130 ml. of ethyl acetate was slowly added with stirring. The mixture was cooled and the crystalline hydrochloride was filtered. This product was washed with a mixture of water, acetone, dimethylformamide and ethyl acetate and then with ethyl acetate. The product was sucked dry under nitrogen. It weighed 0.32 gram and assayed 5770 rimocidin units per mg. A sample was dried for analysis at 56° C. under high vacuum for one hour. The salt is soluble in pyridine, N,N-dimethylformamide and methanol and slightly soluble in water. It is insoluble in ethyl acetate.

What is claimed is:

1. A process for producing PA 166, which comprises cultivating *Streptomyces glaucus* No. ATCC 12,730 in an aqueous nutrient medium containing a carbohydrate and a source of organic nitrogen, under submerged aerobic conditions until substantial antibacterial activity is imparted to said medium.

2. A process as claimed in claim 1 wherein the PA 166 is recovered from the fermentation broth.

3. A process for producing PA 166, which comprises cultivating *Streptomyces glaucus* No. ATCC 12,730 in an aqueous nutrient medium containing a carbohydrate and a source of organic nitrogen, under agitated, submerged aerobic conditions at a temperature of from about 24° to about 30° C., for a period of from about one day to about four days.

4. A substance specifically effective in inhibiting the growth of fungi, selected from the class consisting of an amphoteric substance which is sparingly soluble in water and in lower aliphatic alcohols, substantially insoluble in acetone, ethyl acetate and benzene, and readily soluble in pyridine, N-dimethylformamide, aqueous hydrochloric acid, aqueous sodium hydroxide, aqueous butanol and methanol containing from 1 to 2% calcium chloride, which is capable of forming salts with acids and with bases, which in concentrated hydrochloric acid gives a blue color persisting for about 1 hour; and which in pure crystalline form decomposes without definite melting above 150° C. in 0.1 N HCl in N-dimethylformamide c., 1%) has an optical rotation of about $[\alpha]_D^{25} = 240$ to 242°, has the approximate elemental analysis in percentage by weight: carbon 59.6, hydrogen 7.7, nitrogen 2.0, exhibits characteristic peaks in the ultraviolet region of the spectrum at 291, 304 and 319

$$(E_{1cm.}^{1\%} = 710, 1090 \text{ and } 990$$

respectively), and when suspended in a potassium bromide pellet exhibits characteristic absorption in the infrared region as shown in FIGURE 1 and particularly at the following frequencies expressed in reciprocal centimeters: 1005, 1053 to 1031, 1085, 1279 to 1255, 1401, 1563, 1706, 2866 and 3333, and the salts of said amphoteric substance.

5. An amphoteric substance specifically effective in inhibiting the growth of fungi, which is sparingly soluble in water and in lower aliphatic alcohols, substantially in soluble in acetone, ethyl acetate and benzene, and readily soluble in pyridine, N-dimethylformamide, aqueous hydrochloric acid, aqueous sodium hydroxide, aqueous butanol and methanol containing from 1 to 2% calcium chloride, which is capable of forming salts with acids and with bases, which in concentrated hydrochloric acid gives a blue color persisting for about 1 hour; and which in pure crystalline form decomposes without definite melting above 150° C., in 0.1 N HCl in N-dimethylformamide (c., 1%) has an optical rotation of about $[\alpha]_D^{25} = +240$ to 242°, has the approximate elemental analysis in percentages by weight: carbon 59.6, hydrogen 7.7, nitrogen 2.0, exhibits characteristic peaks in the ultraviolet region of the spectrum at 291, 304 and 319

$$(E_{1cm.}^{1\%} = 710, 1090 \text{ and } 990$$

respectively), and when suspended in a potassium bromide pellet exhibits characteristic absorption in the infrared region as shown in FIGURE 1 and particularly at the following frequencies expressed in reciprocal centimeters: 1005, 1053 to 1031, 1085, 1279 to 1255, 1401, 1563, 1706, 2866 and 3333.

6. An acid salt of the amphoteric substance of claim 5.

7. A basic salt of the amphoteric substance of claim 5.

8. The hydrochloride salt of the amphoteric substance of claim 5.

9. The trimethylamine sulfate salt of the amphoteric substance of claim 5.

10. The sodium salt of the amphoteric substance of claim 5.

References Cited by the Examiner

FOREIGN PATENTS 712,547   7/1954   Great Britain.

OTHER REFERENCES

Ball et al.: J. Gen. Microbiology, August 1957, pp. 96–102.

English et al.: Antibiotics Annual, 1957–1958, pp. 893–914, pub. 1957.

J. of Antibiotics, Ser. A, July 1953 (pages 145 and 146).

J. of Antibiotics, Ser. B, April 1955 (page 91).

Sneath J., Gen. Microbiol., August 1957, pp. 184–200, page 185 is especially pertinent.

Vandeputte et al.: Abstract of Paper No. 81 presented at 3rd Annual Antibiotic Symposium 1955, Washington, D.C., one page, Vandeputte et al.: "Antibiotics Annual 1955–1956," pp. 587–591, pub. 1956.

Waksman et al.: "The Actinomycetes and Their Antibiotics," 1953 (pages 91, 176, 177 and 197).

JULIAN S. LEVITT, *Primary Examiner.*

W. B. KNIGHT, MORRIS O. WOLK, IRVING MARCUS, *Examiners.*

D. LEVY, SAM ROSEN, *Assistant Examiners.*